United States Patent
Acharya et al.

(10) Patent No.: US 7,047,483 B1
(45) Date of Patent: May 16, 2006

(54) COMPUTER IMPLEMENTED METHOD AND APPARATUS FOR PROVIDING A LOGICAL POINT OF ACCESS TO ONE OR MORE FILES

(75) Inventors: Swarup Acharya, New Providence, NJ (US); Henry F. Korth, Lower Gwynedd, PA (US); Viswanath Poosala, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/328,607

(22) Filed: Jun. 9, 1999

Related U.S. Application Data

(60) Provisional application No. 60/098,678, filed on Sep. 1, 1998.

(51) Int. Cl.
*G06F 15/00* (2006.01)

(52) U.S. Cl. ............... 715/501.1; 715/500.1; 707/205

(58) Field of Classification Search ........ 707/501, 707/501.1, 102, 205; 709/223; 715/501.1, 715/500.1
See application file for complete search history.

(56) References Cited

U.S. PATENT DOCUMENTS

| | | | | |
|---|---|---|---|---|
| 5,706,502 A | * | 1/1998 | Foley et al. | 707/10 |
| 5,764,235 A | | 6/1998 | Hunt et al. | 345/428 |
| 5,867,162 A | * | 2/1999 | O'Leary et al. | 345/843 |
| 6,035,330 A | * | 3/2000 | Astiz et al. | 345/738 |
| 6,085,199 A | * | 7/2000 | Rose | 707/1 |
| 6,112,239 A | * | 8/2000 | Kenner et al. | 709/224 |
| 6,134,588 A | | 10/2000 | Guenthner et al. | 709/226 |
| 6,208,995 B1 | * | 3/2001 | Himmel et al. | 707/104.1 |
| 6,230,196 B1 | * | 5/2001 | Guenthner et al. | 709/223 |
| 6,408,296 B1 | * | 6/2002 | Acharya et al. | 707/10 |
| 2003/0188263 A1 | * | 10/2003 | Bates et al. | 715/513 |

OTHER PUBLICATIONS

David R. Airth, Navigation in Pop–up Menus, Microsoft Corporation, 1993.*
"Cost–Aware WWW Proxy Caching Algorithms", Pai Cao and Sandy Irani, Technical Report CS–TR–97–1343, University of Wisconsin, Madison, May 1997.
"Adapting to Network and Client Variability Via On–Demand Dynamic Distallation", Armando Fox, Steven D. Gribble, Eric A. Brewer and Elan Emir, In *Proceedings of the Seventh International Conference on Architectural Support for Programming Languages and Operating Systems*, pp. 160–170, Cambridge, Massachusetts, Oct. 1–5, 1996. ACM SIGARCH, SGIOPS, SIGPLAN, and the IEEE Computer Society.
Fast Approximate Answers to Aggregate Queries on a Data Cube, Viswanath Poosala and Venkatesh Ganti, Submitted for Publication, 1997.

(Continued)

*Primary Examiner*—Heather R. Herndon
*Assistant Examiner*—R. Singh

(57) ABSTRACT

A method and apparatus for communicating files over a communications network in which links to files, such as hyperlinks, comprise a multilink. A multilink is a hyperlink associated with a plurality of electronic addresses, each leading to a different physical file. Selection of a multilink results in the generation of a menu of options for all of the different files that can be returned to the client corresponding to the selected multilink. Selection of an option results in returning of the associated file to the client.

31 Claims, 3 Drawing Sheets

OTHER PUBLICATIONS

"Exploring Bounds of Web Latency Reduction from Caching and Prefetching", T. Kroeger, D. Long and J. Mogul, USENIX Symposium on Internet Technologies and Systems, 1998.

"Quality Controlled Compression of Sets of Images", Miron Livny and Viresh Ratnakar, MMDBMS '96, 1996.

"System–Wide Multiresolution" R. L. Read, D. S. Fussell and A. Silberschatz, Technical Report TR–93–04, The University of Texas at Austin, Department of Computer Sciences, Feb., 1993.

"Scenarios for the Delivery of Negotiated Content", Edward Hardie, NASA NIC, Downloaded from the World Wide Web @ http://www.ietf.org prior to May 1998.

"Ericsson Speeds Up Wireless Web Browsing" Business Wire, May 18, 1999.

Schloss, R.J., "Novel business uses of independently created hyperlinks in the World Wide Web: basic mechanism and examples" Proceedings of the Annual Hawaii International Conference on System Sciences, XX XX, vol. 2, Jan. 3, 1996.

Pitkow, J. E. et al, "Supporting the Web: A Distributed Hyperlink Database System" Computer Networks and ISDN Systems, North Holland Publishing. Amsterdam, NL, vol. 28, No. 11, May 1, 1996.

* cited by examiner

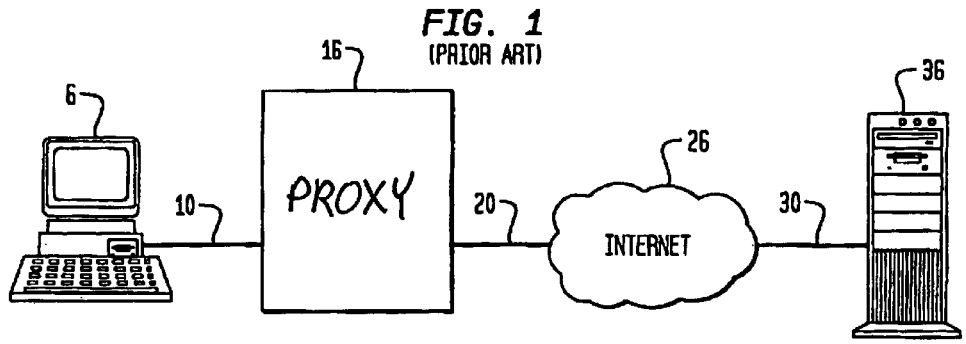

NetBlitz Publications

- NetBlitz: A Novel Solution to "World-Wide Wait", S. Acharya, H. Korth and V. Poosala.
  (letter+figures, letter-figures, A4+figures, A4-figures)

- Systematic Multiresolution and Its Application to the WWW, S. Acharya, H. Korth and V. Poosala.
  (letter+figures, letter-figures, A4+figures, A4-figures)

- Using Multiresolution-aware Cache Management to Improve Web Performance, S. Acharya, H. Korth and V. Poosala.
  (letter+figures, letter-figures, A4+figures, A4-figures)

FIG. 2B

NetBlitz Publications

- NetBlitz: A Novel Solution to "World-Wide Wait", S. Acharya, H. Korth and V. Poosala.
  Multi-link for this paper

- Systematic Multiresolution ... to the WWW, S. Acharya, H. Korth and V. Poosala.
  (letter+figures, letter-fi...

- Using Multiresolution-aware ... Improve Web Performance, S. Acharya, H. Korth and V. Poosala.
  (letter+figures, letter-fi... A4-figures)

Select a version
1. letter+figures
   - ps
2. letter-figures
   - ps
3. A4+figures
   - ps
4. A4-figures
   - ps

FIG. 3

```
Select a version
  1. letter+figures
     ◦ ps
  2. letter-figures
     • ps
  3. A4+figures
     • ps
  4. A4-figures
     • ps
```

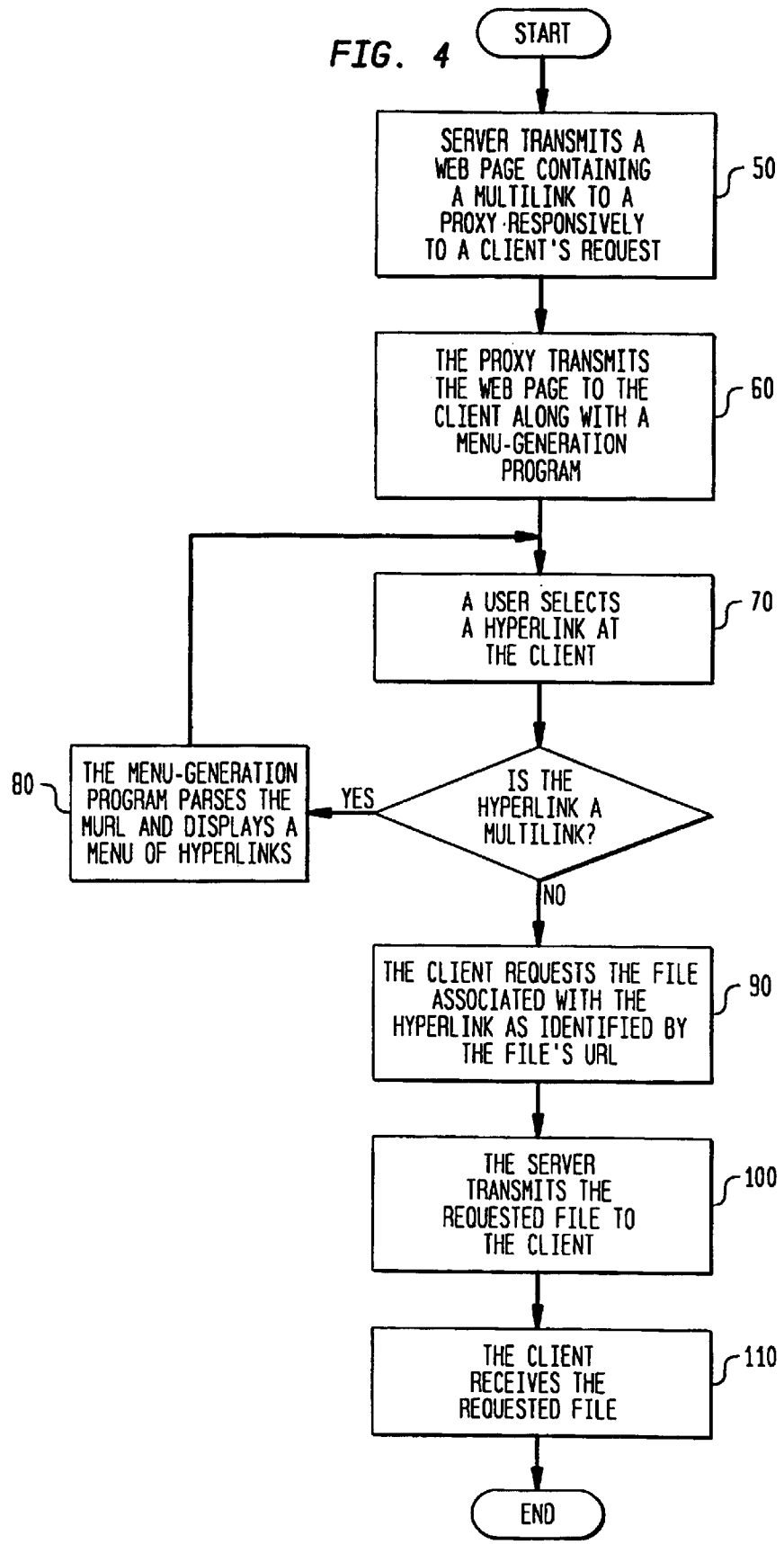

COMPUTER IMPLEMENTED METHOD AND APPARATUS FOR PROVIDING A LOGICAL POINT OF ACCESS TO ONE OR MORE FILES

RELATED APPLICATION

This application claims the benefit of U.S. Provisional Application No. 60/098,678, filed Sep. 1, 1998.

FIELD OF THE INVENTION

This invention relates to communications networks, generally, and more particularly to a method of communication within such communications networks and apparatuses for practicing the inventive method.

BACKGROUND OF THE INVENTION

The World Wide Web ("Web") is essentially a distributed depository of data files stored on Web servers connected by a global communications network known as the Internet. Users of the Web may request transmission of files to their own computers, i.e., client computer, for viewing, storing or printing. Each server computer stores files identified by a universal resource locator (URL) comprising an electronic address. Each URL is a physical reference in that each URL points to a particular server and identifies the location of a single file at that server. Many of the files stored on servers are documents written in a standard programming language known as hypertext mark-up language (HTML). HTML files are translated for viewing, printing or storing by a Web browser computer program running on the Web clients. The Web browser also communicates with Web servers. Using HTML, an author of such a Web page (a file written in HTML) can designate a specific word, phrase or image in the Web page as a hyperlink. Each hyperlink may be associated with a URL of another file stored on the Web. A user's selection of a hyperlink is an initiation of a request for the file located at the electronic address identified by the URL with which the hyperlink is associated. Since each traditional hyperlink is associated with a single URL, each hyperlink is associated with a single file having a particular location on a particular server.

A request for transmission of a file originates at the Web client and is submitted to a server computer by the Web browser software running on the client computer. In a typical arrangement, the request is then forwarded to a proxy computer interconnecting the client computer and the server computer. Upon a user's selection of a hyperlink, the client's Web browser issues a hypertext transfer protocol (HTTP) request to the server identified by the URL associated with the hyperlink. The request is intercepted by a proxy which then relays the request over the Internet to the identified server. The server responds by transmitting the requested file to the proxy, assuming that the requested file resides on the server at the electronic address identified in the URL. The proxy then relays the requested file to the client.

The standard HTML syntax of Web pages and the standard HTTP communications protocol supported by the Web guarantee that a Web client and Web browser can communicate with any Web server. The JAVA programming language and JAVA applets allow for platform independent application programs which can be executed by any Web client.

Many files on Web servers may be considered to be related. For example, due to the vastly heterogenous resources of Web clients and Web servers, there are a number of files which are related in that they contain the same or similar content, but are unique in that they have differing formats, e.g., postscript, ADOBE®, ACROBAT®, JPEG, GIF, TIFF, etc. to accommodate the capabilities of these vastly heterogenous client computers. Other files which do not have similar content also may be considered related. For example, a list of documents published by a single author, a grouping of a person's favorite Web sites, etc. Under the existing URL system, each file is presented with its own hyperlink. We have discovered that it would be advantageous to provide access to a group of related files through a single, logical access point, e.g., a hyperlink.

SUMMARY OF THE INVENTION

Accordingly, it is an object of the present invention to provide a method for satisfying a request for information by permitting access to a plurality of files upon selection of a single, logical access point. It is another object of the present invention to provide such a method which is compatible with existing communications protocols and Web browsers. It is yet another object of the present invention to provide apparatuses for carrying out the inventive method.

These and other objects are realized by the provision of a method for communicating files over a communications network in which links to files, such as hyperlinks, comprise a new construct herein termed a multilink. A multilink is a hyperlink associated with a plurality of electronic addresses (e.g., URLs) rather than a single electronic address. The addresses are concatenated within a single multilink URL associated with the multilink. The selection of a multilink results in execution of a program that parses the multilink URL, identifies the electronic addresses associated with the multilink and generates a menu showing all of the different hyperlinks accessible via the multilink. The user then selects one particular hyperlink from the displayed menu. The URL to the file associated with the selected hyperlink is then used to request the file from the appropriate server and the desired file is returned.

DESCRIPTION OF THE DRAWINGS

FIG. 1 is a symbolic diagram of a simplified World Wide Web topology as known in the prior art.

FIG. 2a is an image of an example of a Web page which shows hyperlinks in accordance with the prior art. FIG. 2b is an image of an example of a Web page which shows a multilink and a menu in accordance with the present invention.

FIG. 3 is an image of an example of a Web page showing a default Web page in accordance with the present invention.

FIG. 4 is a symbolic diagram illustrating communication in accordance with the present invention using a multilink.

DETAILED DESCRIPTION

FIG. 1 is a symbolic diagram of a simplified Web topology as is known in the prior art. In the example of FIG. 1, the Web client 6 is the user's computer. The client 6 may connect to an Internet Service Provider (not shown) over a communications line 10, using a modem in the client. The Internet Service Provider typically controls the proxy 16 which has a dedicated connection over a transmission link 20 to the Internet 26, a sub-network of switching nodes and transmission links. A Web server 36 is connected to the Internet 26 by a transmission link 30. In actuality, the Web's topology is much more complex with numerous servers, clients, proxies, transmission links, etc.

Using Web browser software running on the client computer, the user requests an image, document, multimedia or other data file (herein referred to collectively as "file") by selecting a hyperlink. Upon selection of a hyperlink, the user's client computer submits a request to a server computer identified in the URL associated with the selected hyperlink. In a typical Web topology, the URL is transmitted to the proxy over link 10 using the GET URL HTTP request, which then forwards it over transmission link 20 to the server 36 via the Internet 26 and transmission link 30. The server 36 responds to the request by transmitting the file identified in the URL via the Internet 26 to the proxy 16 which then forwards the file to the client for viewing, storing or printing.

The present invention provides a method and apparatus for satisfying a request for transmission of a file, the request initiating with a user's selection of a logical point of access to one or more files, the logical request being later paired with an electronic address at which the requested file may be located. The present invention is discussed in lot relation to what is referred to herein as a "multilink".

A multilink, as referred to herein, is a particular type of hyperlink which provides a single logical point of access to multiple files. As discussed above, a traditional hyperlink is established by HTML programming associating the hyperlink with a single electronic address identifying a single file on a particular server. Rather, the multilink is a logical point of access to a plurality of files which are associated with the multilink (U.S. patent application Ser. No. 09/328627, filed concurrently herewith, describes alternate methods and apparatuses of providing a logical access point to information content which may be embodied in a plurality of versions of files having different format or levels of resolution.) A multilink in accordance with the present invention appears in the Web browser much like a traditional hyperlink, but differs from the traditional hyperlink in that a user's selection of the multilink results in generation and display of a menu of a plurality of user-selectable options. Preferably each option is a hyperlink. Each hyperlink displayed in the menu could be a traditional hyperlink, another multilink, or an indirect link (U.S. patent application Ser. No. 09/328606, filed concurrently herewith, describes a method and apparatus for providing such indirect links). A multilink is a logical point of access in that it is not directly related to a particular physical reference. Rather, it is a logical reference to a plurality of files. In the HTML context, a multilink may be associated with a multilink URL ("MURL") where the MURL comprises a plurality of electronic addresses. In the preferred embodiment, each electronic address is associated with a description, in the form of a hyperlink, identifying the file found at the corresponding electronic address. The description is displayed in a menu generated and displayed when the multilink is selected.

In accordance with the present invention, a menu-generation computer program is executed upon a user's selection of a multilink. The computer program parses the MURL associated with the multilink and presents a menu. The computer program preferably is written in a platform independent computer programming language that is compatible with standard Web browsers. In the preferred embodiment, the computer program is written in the Javascript programming language. The computer program may be executed at any suitable location, i.e., client, proxy, or server. However, it is preferable that the menu generation computer program be transmitted to and executed at the client computer. The computer program may be transmitted to the client computer in a number of ways. In one embodiment, a reference to the menu generation computer program is embedded or appended by the proxy computer. In the preferred embodiment, the proxy computer embeds or appends a reference only in pages containing a multilink. In the most preferred embodiments a reference to the computer program is embedded in each Web page (parent file) containing a multilink. In such an embodiment, the client computer automatically requests the computer program upon loading the Web page. Alternatively, the entire program could be appended to the parent file before transferring the parent file to the client computer. Either the proxy computer or the server computer could perform the embedding or appending steps.

While adoption of such a distribution scheme for the computer program would be sufficient to ensure operability of the multilinks if all proxies were to use the distribution scheme, in the preferred embodiment, a backup system is employed. In such a system, a traditional URL leading to a file containing the menu generation program is included in the parent file. For instance, the MURL associated with the multilink preferably may further comprise a default electronic address to a default Web page containing only the menu generation computer program. Accordingly, in the event that the computer program is not transmitted or otherwise accessible to the client, traditional processing of the MURL will cause the default Web page to be loaded, at which time the computer program will be executed.

By way of example, a traditional URL typically has a format as follows:

http://<server$_{13}$ address>/<filename.ext>

In the example of FIG. 2A, the traditional URL http://www.lucent.com/research/1998/articles.htm is an electronic address identifying the file named articles.htm in the research/1998 subdirectory on the www.lucent.com server. Note that four hyperlinks are shown beneath the each article title for requesting the article in letter or A4 format, and with or without figures.

In contrast, the general format of a MURL in accordance with a preferred embodiment of the present invention has the form:

http://<server_address>/<multilink_default.html>?mlink::<des$_1$=URL$_1$>,<des$_2$=URL$_2$>. . . ,<des$_N$=URL$_N$> where des$_1$ is the description string for the i'th hyperlink and URL$_i$ is the electronic address of the i'th hyperlink. Each URL$_i$ may be a traditional URL, a MURL or a logical reference of the type referred to above as an indirect link.

FIG. 2B illustrates an exemplary Web page employing a multilink in accordance with the present invention. Note that only a single hyperlink (a multilink) appears for the article titled "NetBlitz: A Novel Solution to the 'World Wide Wait'" the multilink reading "Multi-link for this paper". The format of the multilink URL for this article could have the format:

http://www.lucent.com/research/1998/default.htm?
mlink::letter+figures=http://www.lucent.com/research/
1998/letfig.htm,letter-figures=http://www.lucent.com/
research/1998/research/letnofig.htm,A4+figures=
http:// www.lucent.com/research/1998/A4fig.htm,A4-
figures=http://www.lucent.com/research/1998/
A4nofig.htm.

Accordingly, upon a user's selection of the NetBlitz multilink, the menu generation computer program that had been previously transmitted from the proxy computer to the client computer along with the NetBlitz Publications Web page containing the multilink would be executed to generate the menu of hyperlinks to the article. As noted above, in alternate embodiments, in which the menu generation program is not appended or a reference to the menu generation program is not embedded within pages having multilinks, selection of the multilink may instead lead to a default page (i.e., file), such as shown in FIG. 3, containing the menu generation program. Specifically, regardless of whether the menu generation program is executed at the client computer or at the server computer containing the default menu generation page, the menu generation program parses the various individual URLs in the MURL and displays a menu of the options. FIG. 2B shows the menu that might be generated in an embodiment in which a reference to the menu generation program is embedded in the page containing the multilink. Note that it preferably appears as a pop-up menu. In an alternate embodiment, in which the menu generation program is at a separate page, a Web page is displayed containing hyperlinks to the article in (1) letter with figures, (2) letter without figures, (3) A4 with figures, and (4) A4 without figures formats. The content of the default page in FIG. 3 is the same as the menu in FIG. 2B. This is also the default page located at http://www.lucent.com/research/1998/default.htm as identified in the MURL.

FIG. 4 is a flowchart demonstrating communications over a communications network using multilinks in accordance with a preferred embodiment of the present invention. A server computer first transmits a Web page containing a multilink to a proxy computer responsive to a client computer's request for the Web page as shown at 50. The proxy computer then transmits the Web page to the client computer along with a menu generation program which it appends to the Web page as shown in step 60. After the Web page is displayed at the user's client computer, the user selects a hyperlink as shown in step 70. In step 75, it is determined if the hyperlink is a multilink. If so, in step 80, the menu generation program is run to parse the MURL associated with the hyperlink and display a menu of hyperlinks, each hyperlink being a user-selectable option. The user then repeats step 70 by selecting a hyperlink from the menu. Since, as noted above, a hyperlink in the menu may be another multilink or an indirect link, this process is repeated until the user selects a hyperlink associated with a traditional URL, at which time flow proceeds to step 90, in which the client computer requests the file associated with the hyperlink as identified by the file's URL 90. If the first selected hyperlink was not a multilink, as determined in step 75, flow proceeds directly to step 90, in which the client computer requests the file associated with the hyperlink as identified by the file's URL. In step 100, the server computer then transmits the requested file to the client computer in the usual fashion. In step 110, the client computer receives the requested file which is displayed by the Web client's browser.

It should also be noted that, although a logical reference in the form of a multilink URL is most useful in association with a hyperlink, a multilink URL logical reference may be advantageously used independently of a corresponding hyperlink, e.g., for images or other files, embedded in a Web page. For example, a file identified by a multilink URL logical reference which is embedded in a Web page is automatically requested by the client computer's Web browser in the process of loading the Web page for display at the client computer.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of operation of a client computer comprising the steps of:

(a) displaying, at the client computer, a multilink as a hyperlink, the multilink providing a logical point of access to a plurality of distinct files, each of the plurality of files differing from others of the plurality of distinct files, each of the plurality of distinct files having a respective unique electronic address, each of the electronic addresses being associated with the multilink, each of the electronic addresses being contained in a file at the client computer, the file containing the electronic addresses of the distinct files being interpretable to display the multilink;

(b) generating a menu of options, at the client computer, in response to a user's selection of the multilink, each option of the menu of options being associated with at least one of the plurality of files; and (c) transmitting, from the client computer, a request for a user-selected file associated with a user-selected option, the request being made using a corresponding one of the electronic addresses from the file interpretable to display the multilink.

2. The method of claim 1, further comprising the step of:

(d) selecting, at the client computer, the user-selected option from the menu of options, the user-selected option being associated with the user-selected file, step (d) being performed intermediate steps (b) and (c).

3. The method of claim 2, wherein the request transmitted in step (c) identifies the unique electronic address of the user-selected file.

4. The method of claim 1, wherein the electronic addresses of the plurality of files are concatenated in a multilink URL associated with the multilink, the multilink URL being contained in the file interpretable to display the multilink.

5. The method of claim 4, wherein the menu of options is generated by parsing, at the client computer, the multilink URL to identify each electronic address and presenting an option in the menu of options for each of the electronic addresses.

6. The method of claim 5, wherein the menu of options is generated in step (b) by a computer program for parsing the multilink URL to identify the electronic addresses and generating the menu of options.

7. The method of claim 6, wherein the menu of options comprises a pop-up menu that no more than partially obscures a web page containing the multilink.

8. The method of claim 7, wherein the electronic addresses include an electronic address of a default file containing the computer program.

9. The method of claim 8, further comprising the step of:

(e) receiving, at the client computer, the computer program, step (e) being performed before step (b).

10. The method of claim 9, wherein a proxy computer for relaying a communication between a client computer and a server computer interconnects the client computer to the server computer and wherein the proxy computer appends the computer program to every file transmitted from the proxy computer, the method further comprising the step of:

(f) transmitting, from the proxy computer to the client computer, the file containing the multilink URL, the file having the computer program appended thereto, step (f) being performed before step (e).

11. The method of claim 9, wherein a proxy computer for relaying a communication between a client computer and a server computer interconnects the client computer to the server computer and wherein the proxy computer appends the computer program to every file containing a multilink URL which is transmitted from the proxy computer, the method further comprising the step of:
(f) transmitting, from the proxy computer to the client computer, the file containing the multilink URL, the file having the computer program appended thereto, step (f) being performed before step (e).

12. The method of claim 9, wherein a proxy computer for relaying a communication between a client computer and a server computer interconnects the client computer to the server computer and wherein the proxy computer embeds a reference to the computer program in every file transmitted from the proxy computer, the method further comprising the steps of:
(f) transmitting, from the proxy computer to the client computer, the file containing the multilink URL, the file having the reference to the computer program embedded therein, step (f) being performed before step (e); and
(g) transmitting, from the client computer, a request for transmission of the computer program to the client computer, step (g) being performed intermediate steps (f) and (e).

13. The method of claim 9, wherein a proxy computer for relaying a communication between a client computer and a server computer interconnects the client computer to the server computer and wherein the proxy computer embeds a reference to the computer program in every file containing a multilink URL which is transmitted from the proxy computer, the method further comprising the steps of:
(f) transmitting, from the proxy computer to the client computer, the file containing the multilink URL, the file having the reference to the computer program embedded therein, step (f) being performed before step (e); and
(g) transmitting, from the client computer, a request for transmission of the computer program to the client computer, step (g) being performed intermediate steps (f) and (e).

14. The method of claim 1, wherein the menu of options comprises hyperlinks associated with URLs.

15. The method of claim 14, wherein at least one of the hyperlinks is a multilink.

16. A servicing computer for servicing a request for a file initiated by a client computer connected to the servicing computer by a communications network, the servicing computer comprising:
a memory;
a processor;
a first computer program stored in the memory for displaying, at the client computer, a multilink as a hyperlink, the multilink providing a logical point of access to a plurality of distinct files, each of the plurality of files differing from others of the plurality of distinct files, each of the plurality of distinct files having a respective unique electronic address, each of the electronic addresses being associated with the multilink, each of the electronic addresses being contained in a file at the client computer, the file containing the electronic addresses of the distinct files being interpretable to display the multilink;
a second computer program stored in the memory for generating a menu of user-selectable options responsive to a user's selection of a multilink to a plurality of files, each of option of the menu of options being associated with at least one of the plurality of files; and
a third computer program stored in the memory for appending the first computer program to a file transmitted by the servicing computer.

17. The servicing computer of claim 16, wherein the servicing computer is a server computer.

18. The servicing computer of claim 16, wherein the servicing computer is a proxy computer for relaying a communication between a client computer and a server computer.

19. The servicing computer of claim 18, wherein the third computer program is configured to append the second computer program only to files transmitted by the servicing computer which contain a multilink URL.

20. A servicing computer for servicing a request for a file initiated by a client computer connected to the servicing computer by a communications network, the servicing computer comprising:
a memory;
a processor;
a first computer program stored in the memory for displaying, at the client computer, a multilink as a hyperlink, the multilink providing a logical point of access to a plurality of distinct files, each of the plurality of files differing from others of the plurality of distinct files, each of the plurality of distinct files having a respective unique electronic address, each of the electronic addresses being associated with the multilink, each of the electronic addresses being contained in a file at the client computer, the file containing the electronic addresses being interpretable to display the multilink;
a second computer program stored in the memory for generating a menu of user-selectable options responsive to a user's selection of a multilink to a plurality of files, each of option of the menu of options being associated with at least one of the plurality of files; and
a third computer program stored in the memory for embedding a reference to the second computer program to a file transmitted by the servicing computer.

21. The servicing computer of claim 20, wherein the servicing computer is a server computer.

22. The servicing computer of claim 20, wherein the servicing computer is a proxy computer for relaying a communication between a client computer and a server computer.

23. The servicing computer of claim 22, wherein the third computer program is configured to embed a reference only in files transmitted by the servicing computer which contain a multilink URL.

24. A method of operation of a servicing computer for servicing a request from a client computer for a file stored on the servicing computer, the method comprising the steps of:
(a) appending, to the file requested by the client computer, a computer program for parsing, at the client computer, a multilink URL contained in the file, the multilink URL comprising a plurality of electronic addresses, each of the plurality of electronic addresses corresponding to a respective one of a plurality of distinct files, each of the plurality of files differing from others of the plurality of distinct files, the program being capable of parsing the multilink URL to generate a menu of user-selectable options responsive to a user's selection of a multilink associated with the multilink URL, the file being interpretable to display the multilink, each of the options corresponding to a respective one of the plurality of electronic addresses, and an associated one of the plurality of distinct files; and (b) transmitting the file to the client computer responsive to a request therefor.

25. The method of claim 24, wherein the computer program for generating a menu is appended in step (a) only if the file contains a multilink URL.

26. A method of operation of a servicing computer for servicing a request from a client computer for a file stored on the servicing computer, the method comprising the steps of:
   (a) embedding, in the file requested by the client computer, a reference to a computer program for parsing, at the client computer, a multilink URL contained in the file, the multilink URL comprising a plurality of electronic addresses, each of the plurality of electronic addresses corresponding to a respective one of a plurality of distinct files, each of the plurality of files differing from others of the plurality of distinct files, the program being capable of parsing the multilink URL to generate a menu of user-selectable options responsive to a user's selection of a multilink associated with the multilink URL, the file being interpretable to display the multilink, each of the options corresponding to a respective one of the plurality of electronic addresses, and an associated one of the plurality of distinct files; and
   (b) transmitting the file to the client computer responsive to a request therefor.

27. The method of claim 26, wherein the computer program for generating a menu is embedded in step (a) only if the file contains a multilink URL.

28. The method of claim 26, wherein the servicing computer stores the computer program for generating a menu.

29. A method of operation of a computer comprising the steps of:
   (a) displaying a multilink as a hyperlink of a web page, the multilink providing a single logical point of access to a plurality of distinct files, each of the plurality of distinct files being different from others of the plurality of distinct files in at least one of information content and format, each of the plurality of distinct files having a respective unique electronic address, each of the electronic addresses being associated with the multilink, each of the electronic addresses being contained in a file at the client computer, the file containing the electronic addresses of the distinct files being interpretable to display the multilink;
   (b) displaying a menu of options superimposed over the web page to no more than partially obscure the web page, in response to a user's selection of the multilink, each option corresponding to a respective one of the electronic addresses of the file; and
   (c) transmitting a request for a user-selected file associated with a user-selected option, the request being made using the respective one of the electronic addresses from the file interpretable to display the multilink, the respective electronic address corresponding to a user-selected option.

30. The method of claim 29, wherein the multilink is associated with a multilink URL comprising a plurality of electronic addresses.

31. The method of claim 30, wherein the menu of options is a pop-up menu generated by parsing the multilink URL to identify each electronic address, and wherein an option is presented in the menu of options as a respective hyperlink for each electronic address.

* * * * *